US010371930B2

(12) United States Patent
Ando

(10) Patent No.: US 10,371,930 B2
(45) Date of Patent: Aug. 6, 2019

(54) STAGE APPARATUS AND MICROSCOPE

(71) Applicant: CANON KABUSHIKI KAISHA, Tokyo (JP)

(72) Inventor: Masahiro Ando, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 15/562,996

(22) PCT Filed: Mar. 3, 2016

(86) PCT No.: PCT/JP2016/001144
§ 371 (c)(1),
(2) Date: Sep. 29, 2017

(87) PCT Pub. No.: WO2016/163064
PCT Pub. Date: Oct. 13, 2016

(65) Prior Publication Data
US 2018/0364468 A1 Dec. 20, 2018

(30) Foreign Application Priority Data

Apr. 8, 2015 (JP) ................................ 2015-079616

(51) Int. Cl.
*G02B 21/26* (2006.01)
*G02B 21/36* (2006.01)

(52) U.S. Cl.
CPC ............. *G02B 21/26* (2013.01); *G02B 21/36* (2013.01)

(58) Field of Classification Search
CPC ...... G02B 21/26; G02B 21/34; G02B 21/367; G02B 21/365; G02B 21/006; G02B 21/245; G02B 21/24; G02B 21/242; G02B 21/0008; G02B 21/002; G02B 21/0076; G02B 21/06; G02B 21/241; G02B 21/32; G02B 21/0016; G02B 21/0032; G02B 21/0036; G02B 21/008; G02B 21/082;
(Continued)

(56) References Cited

U.S. PATENT DOCUMENTS 4,781,338 A 11/1988 Lattion ......................... 359/398
5,196,713 A 3/1993 Marshall ....................... 250/561
(Continued)

FOREIGN PATENT DOCUMENTS

DE 19541233 5/1996
JP H11-231228 8/1999
(Continued)

*Primary Examiner* — Collin X Beatty
*Assistant Examiner* — Grant A Gagnon
(74) *Attorney, Agent, or Firm* — Venable LLP

(57) ABSTRACT

A stage apparatus includes a first stage, a second stage movable in a first direction relative to the first stage, a sensor which reads a scale moving in the first direction together with the second stage and a sensor base which is formed from a material having a smaller thermal expansion coefficient than the first stage and fixes the sensor to the first stage. The sensor base is fixed to the first stage at two fixing positions located near a second axis having a second direction perpendicular to the first direction and passing through a specific position and sandwiching the specific position, and is fixed to the first stage at a fixing position located near a first axis having the first direction and passing through the specific position and the arrangement position of the sensor so as to be movable in the first direction.

12 Claims, 9 Drawing Sheets

(58) Field of Classification Search
CPC ...... G02B 21/086; G02B 21/16; G02B 21/18;
G02B 21/244; G02B 21/248; G02B
21/30; G02B 21/33; G02B 21/361; G02B
27/646; G02B 5/0891; G02B 7/003;
G02B 7/008; G02B 7/182; G02B 7/38;
G02B 13/0095; G02B 21/0012; G02B
21/0028; G02B 21/004; G02B 21/0084;
G02B 21/0088; G02B 21/0092; G02B
21/12; G02B 21/22; G02B 21/28; G02B
21/36; G02B 21/362; G02B 23/24; G02B
26/0816; G02B 26/0891; G02B 26/108;
G02B 27/10; G02B 27/14; G02B 27/141;
G02B 27/42; G02B 27/62; G02B 27/64;
G02B 3/0087; G02B 5/04; G02B 5/08;
G02B 5/18; G02B 5/3083; G02B 6/0006;
G02B 7/09; G02B 7/10; G02B 7/1822;
G02B 7/1825; G02B 7/1827; C12M
41/14; C12M 41/36; C12M 21/06; C12M
25/01; C12M 41/12; C12M 21/02; C12M
23/12; C12M 23/20; C12M 23/22; C12M
23/44; C12M 23/48; C12M 25/06; C12M
29/00; C12M 29/06; C12M 29/20; C12M
31/02; C12M 37/00; C12M 37/04; G01N
1/312; G01N 2015/1006; G01N
2035/00049; G01N 2035/00138; G01N
2035/0441; G01N 2035/0462; G01N
2035/0493; G01N 21/65; G01N 21/718;
G01N 35/0099; G01N 15/10; G01N
15/1012; G01N 15/1463; G01N 15/1468;
G01N 15/147; G01N 15/1475; G01N
1/286; G01N 1/30; G01N 2015/105;
G01N 2015/1472; G01N 2015/1488;
G01N 2021/0357; G01N 2021/0378;
G01N 2021/0389; G01N 2021/1787;
G01N 2021/479; G01N 2021/558; G01N
21/07; G01N 21/17; G01N 21/253; G01N
21/255; G01N 21/3151; G01N 21/35;
G01N 21/4738; G01N 21/4788; G01N
21/55; G01N 21/553; G01N 21/554;
G01N 21/59; G01N 21/6408; G01N
21/645; G01N 21/6456; G01N 21/6458;
G01N 21/71; G01N 21/76; G01N 21/95;
G01N 2201/0221; G01N 2201/061; G01N
2201/06113; G01N 2201/0693; G01N
2201/0697; G01N 2203/0276; G01N
33/4833; G01N 35/028; G01N 35/04;
G01N 3/04; G01N 3/08
USPC ........................................................ 359/393
See application file for complete search history.

(56) References Cited

U.S. PATENT DOCUMENTS

| | | | |
|---|---|---|---|
| 5,859,707 A | 1/1999 | Nakagawa et al. | 356/401 |
| 2010/0188743 A1 | 7/2010 | Inoue | 359/393 |
| 2011/0089771 A1 | 4/2011 | Brooker et al. | 310/12.05 |
| 2014/0002896 A1 | 1/2014 | Amano et al. | 359/383 |

FOREIGN PATENT DOCUMENTS

| | | |
|---|---|---|
| JP | 2010-175850 | 8/2010 |
| JP | 2014-010354 | 1/2014 |

[Fig. 1]
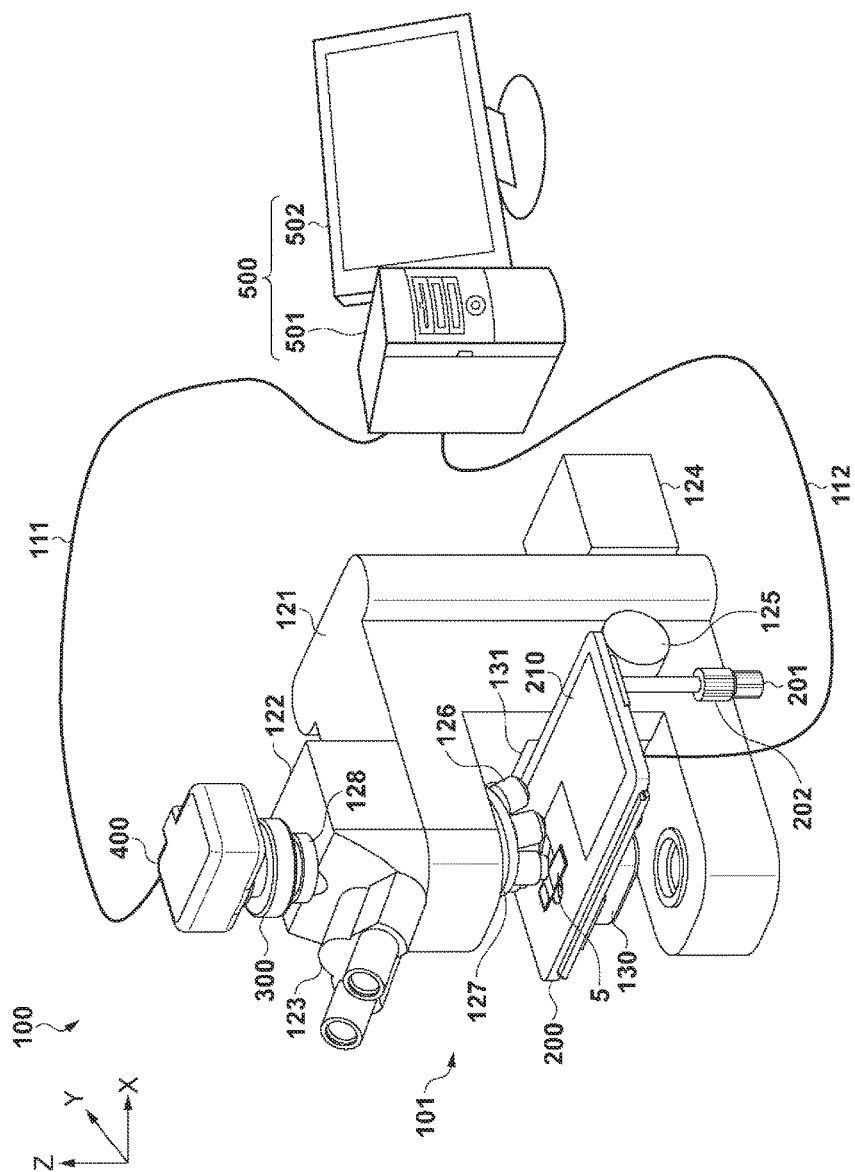

[Fig. 2]
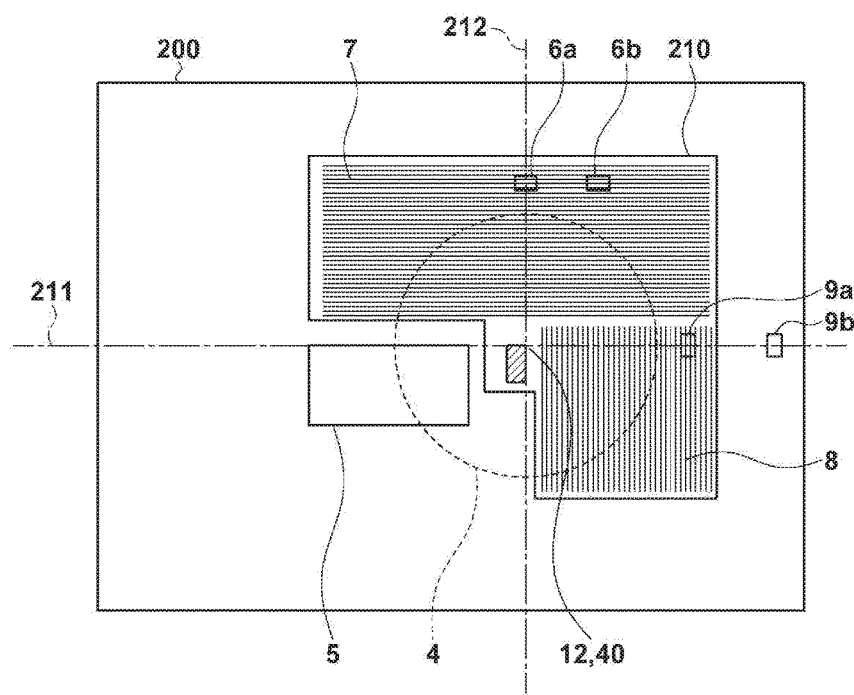

[Fig. 3]
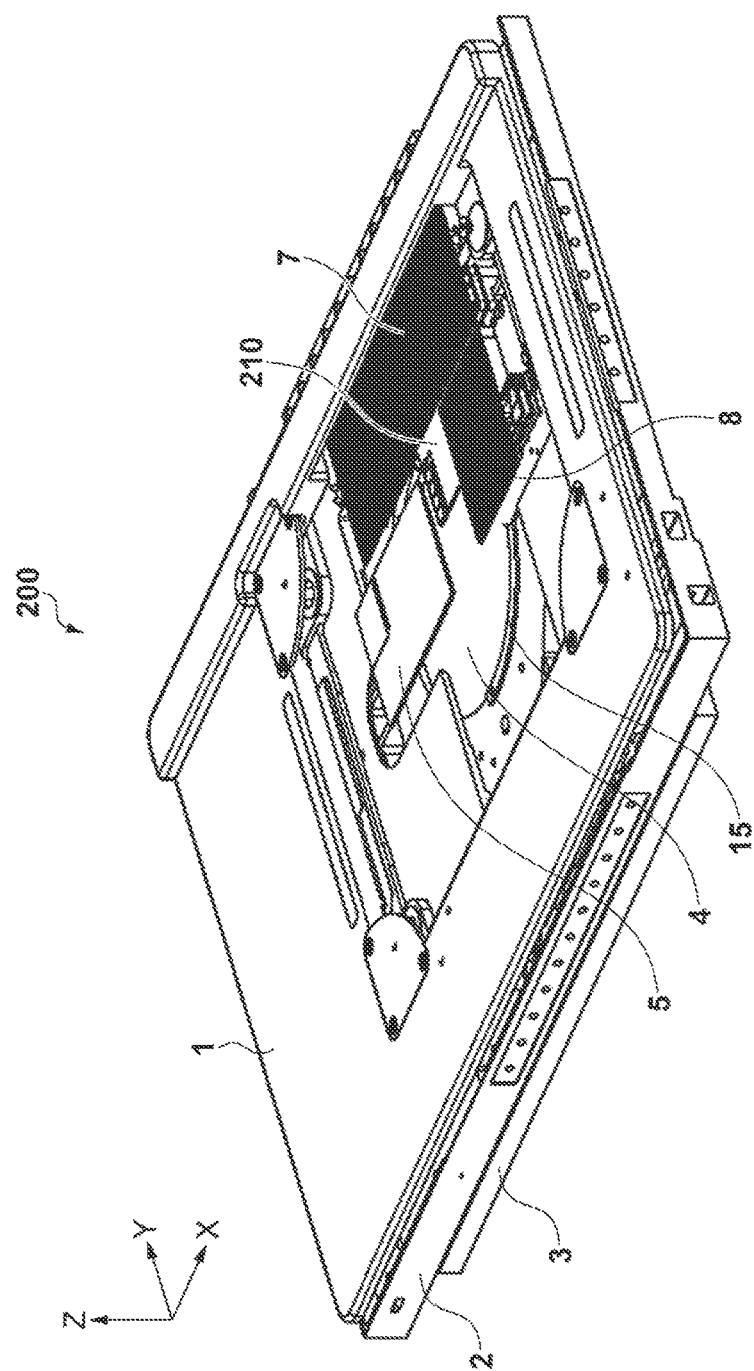

[Fig. 4]
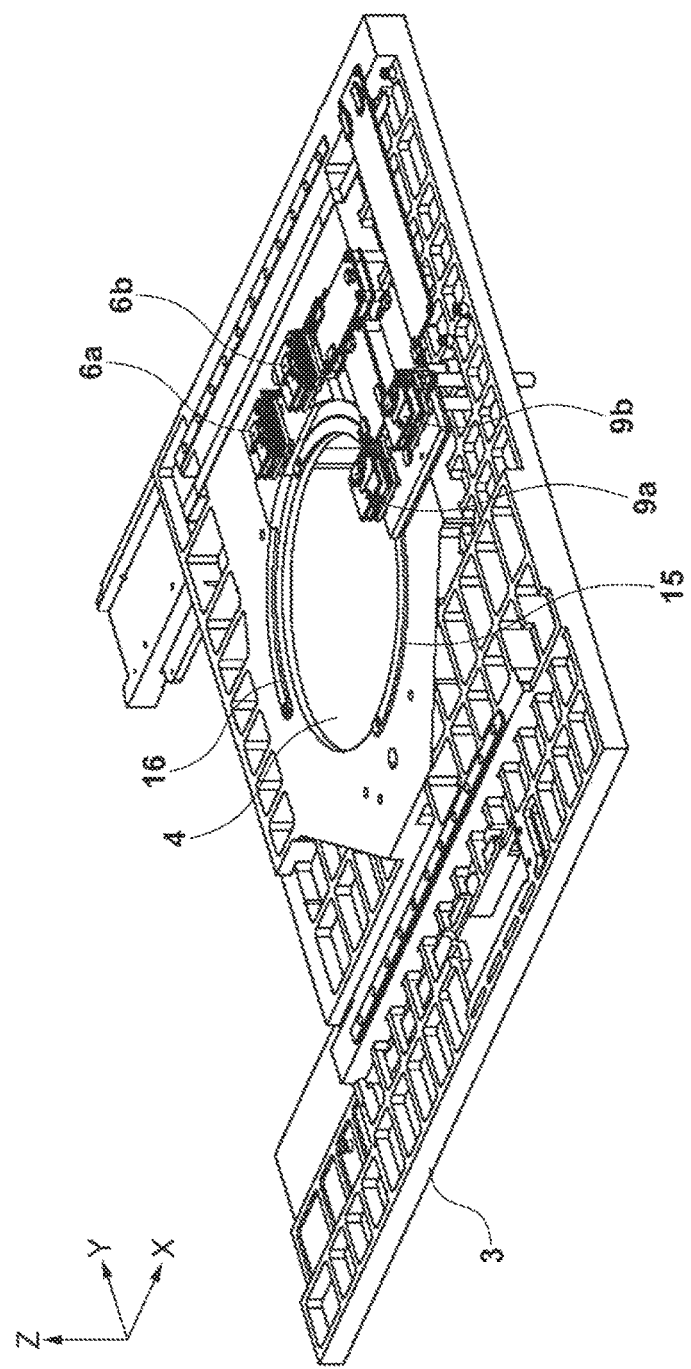

[Fig. 5]
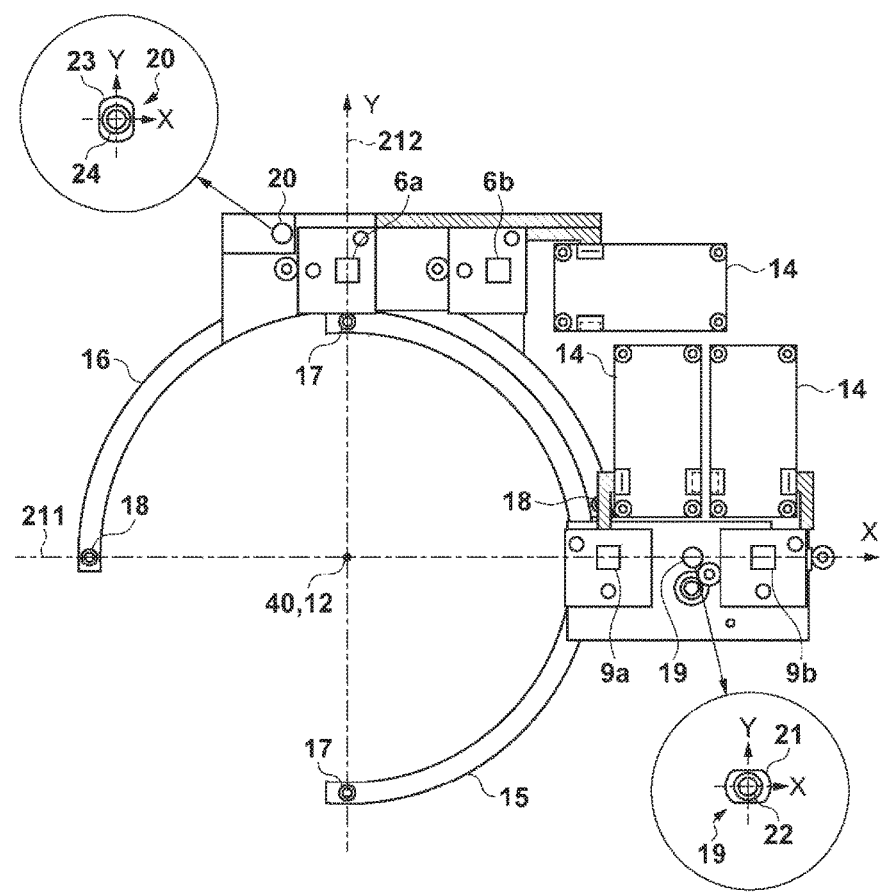

[Fig. 6]
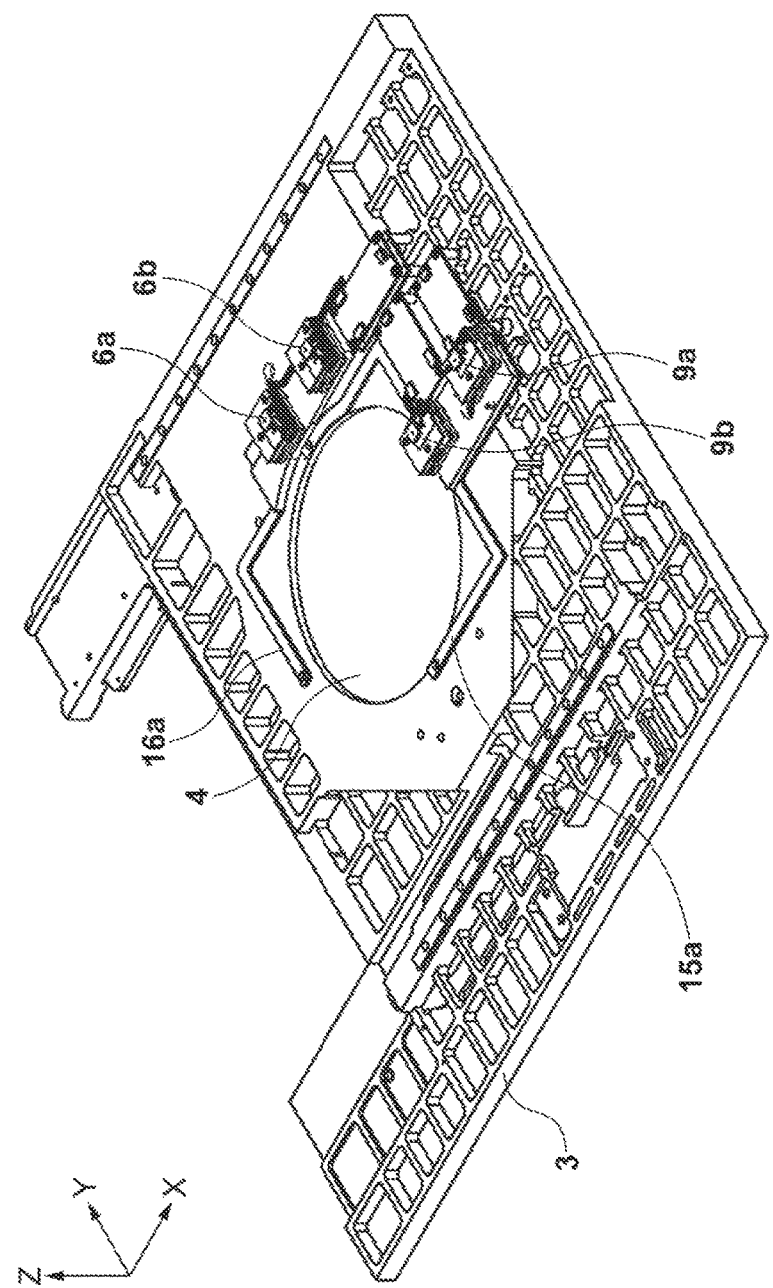

[Fig. 7]
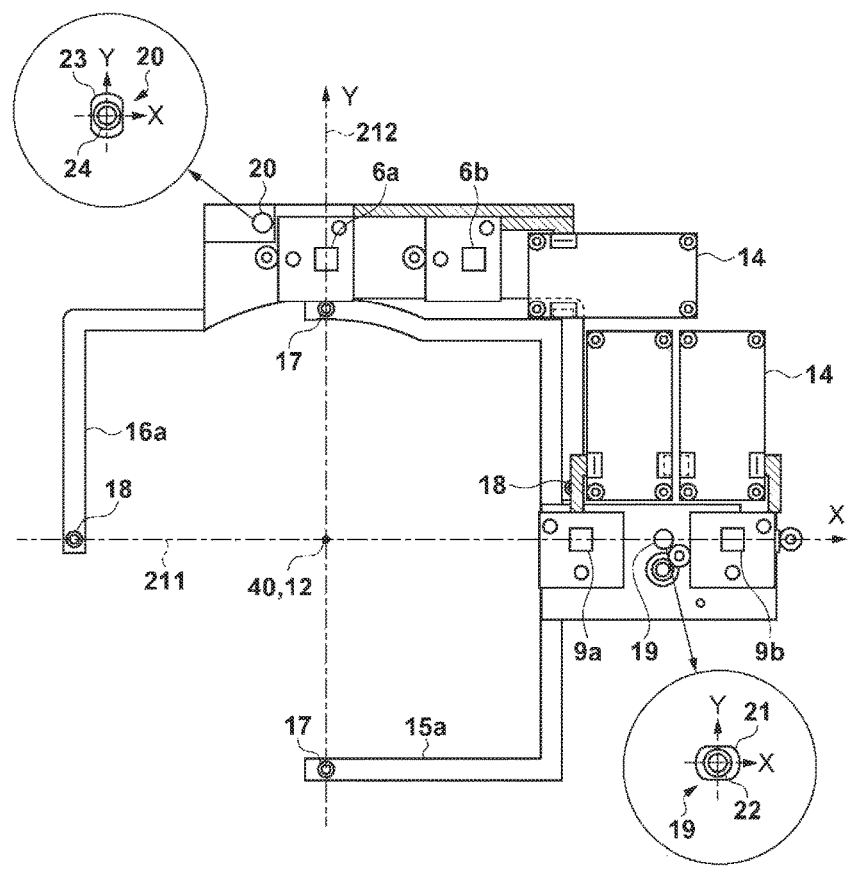

[Fig. 8]
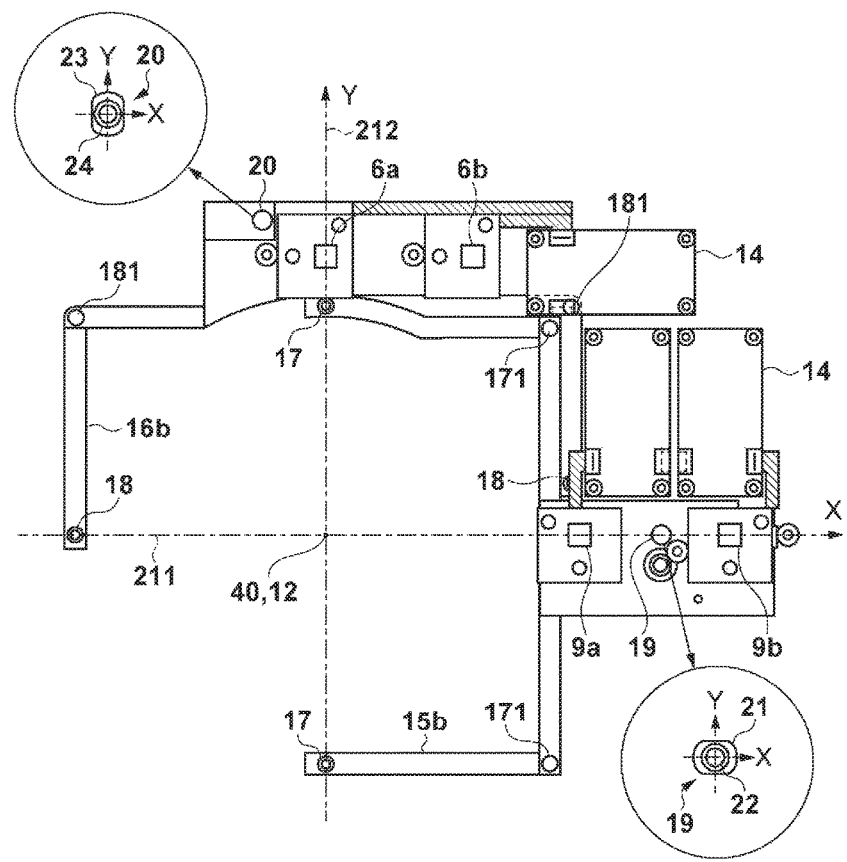

[Fig. 9]
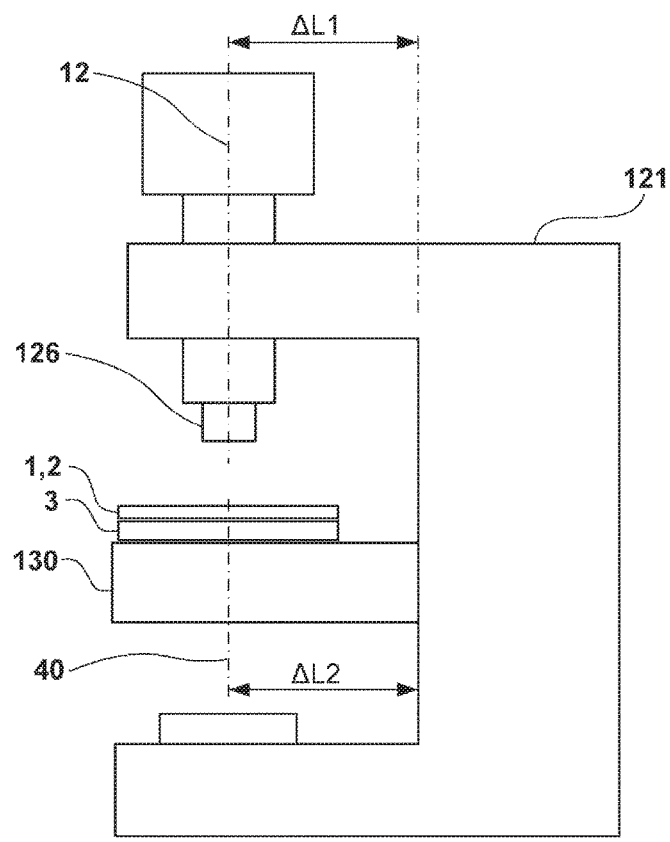

STAGE APPARATUS AND MICROSCOPE

TECHNICAL FIELD

The present invention relates to a stage apparatus which moves while a slide placed thereon and a microscope equipped with the stage apparatus.

BACKGROUND ART

There is a practice of performing pathological diagnosis to identify the type, characteristic, and the like of a lesion by checking part of a tissue harvested from a patient. In such pathological diagnoses, it is necessary to observe the microstructure of a tissue segment in more detail at the microlevel with a microscope (this operation will be referred to as micro-observation or micro-diagnosis hereinafter). An optical microscope has been an especially important tool for pathologists. In addition, when performing micro-diagnosis by the naked eye with a microscope, it is often a case that pathologists want to record important finding images as evidence. For this reason, an optical microscope is equipped with a digital camera to be used for recording finding images. It is also possible to use digital scanners and digital microscopes incorporating digital cameras (image sensing devices).

When performing a morphological diagnosis, a functional diagnosis, and capturing an evidence image with a digital camera in a pathological diagnosis, it is required to easily reproduce an observation position. The structures in a cell are distributed in the μ to sub-μ range. An irregular shape observed in this case can be regarded as an ROI with the minimum size obtained by pathological diagnosis. An objective lens for visible light used in general has a resolution of about 0.2 μm (with 550-nm green light) at 100×. An objective lens for ultraviolet light can resolve up to about 0.1 μm (with 200-nm ultraviolet light). Assuming, therefore, that the minimum size of an ROI is, for example, 1 μm square, which is 10 times 0.1 μm, which is the ultraviolet resolution limit, it can be expected that a target accuracy in observation position management will be set to 0.1 μm, which is the resolution limit, and a unit of coordinate management will be set to 0.01 μm, which is 1/10 the target accuracy. The movement of an observation position is implemented by an XY stage on which a slide is placed and which can move in the X and Y directions perpendicular to the optical axis direction. Therefore, it is required to implement the accurate observation position management described above for an XY stage mounted on a microscope. An XY stage aiming at implementing accurate observation position management (Japanese Patent Laid-Open No. 11-231228 (to be referred to as patent literature 1 hereinafter), Japanese Patent Laid-Open No. 2014-010354 (to be referred as patent literature 2 hereinafter), and Japanese Patent Laid-Open No. 2010-175850 (to be referred to as patent literature 3 hereinafter)).

In observation position management for an XY stage, an XY position is detected by reading a scale, which moves together with an X stage or Y stage, with a sensor. In general, a sensor for reading a scale fixed to an X stage (or Y stage) is fixed to the Y stage (or base stage). However, when the sensor position varies due to the thermal expansion or the like of the stage, the variation appears as an error in an XY position, which can be an error which cannot be neglected when implementing an accuracy on the order of 0.01μ, as described above.

Although the optical axis of a microscope coincides with a sensor position, the sensor is robust against the influence of expansion caused by a temperature change, an optical microscope has an opening portion in an optical axis portion, and hence a sensor cannot be fixed near the optical axis. If the sensor is arranged avoiding the opening portion, since the fixing position of the sensor is separated from the optical axis, enlargement/contraction of the stage caused by a temperature change causes an error in the read position of the stage.

Patent literatures 1 to 3 each describe an apparatus which automatically moves the XY stage of a microscope, but give no consideration to temperature compensation for position control (observation position management) of the XY stage. For example, patent literatures 1 and 3 each disclose a method of automatically moving the XY stage, but pay no attention to the problem that when the stage expands or contracts due to a temperature change, the position of the sensor itself shifts. In addition, the microscope apparatus disclosed in patent literature 2 can reduce the influence of thermal expansion caused by a temperature change in the focus direction. However, this literature describes nothing about temperature compensation in position control of the XY stage in the X and Y directions.

SUMMARY OF INVENTION

Each embodiment according to the present invention provides a stage apparatus which manages the position of a stage by reading a scale with a sensor and can eliminate or reduce the influence of the thermal expansion of the stage on observation position management.

According to one aspect of the present invention, there is provided a stage apparatus including a fixed base and a first stage movable in a first direction relative to the fixed base, the apparatus comprising: a sensor configured to read a scale moving in the first direction together with the first stage; and a sensor base formed from a material having a smaller thermal expansion coefficient than the fixed base and configured to fix the sensor to the fixed base, wherein the sensor base is fixed to the fixed base at two first fixing positions located near a second axis having a second direction perpendicular to the first direction and passing through a specific position on the fixed base and sandwiching a first axis having the first direction and passing through the specific position, and is fixed to the fixed base at a second fixing position near the first axis and an arrangement position of the sensor so as to be movable in the first direction.

Also, according to another aspect of the present invention, there is provided a microscope comprising the above-described stage apparatus, wherein the stage apparatus moves a preparation placed thereon to an observation visual field.

Further features of the present invention will become apparent from the following description of exemplary embodiments (with reference to the attached drawings).

BRIEF DESCRIPTION OF DRAWINGS

FIG. 1 is a perspective view showing the arrangement of a microscope system according to an embodiment;

FIG. 2 is a view for explaining an arrangement for observation position management associated with the stages of a microscope according to the embodiment;

FIG. 3 is a perspective view showing the outer appearance of the stages according to the embodiment;

FIG. 4 is a perspective view showing the outer appearance of a base stage according to the first embodiment;

FIG. 5 is a view showing the mounted states of an X-direction sensor and a Y-direction sensor according to the first embodiment;

FIG. 6 is a perspective view showing the outer appearance of stages according to the second embodiment;

FIG. 7 is a view showing the mounted states of X-direction sensors and Y-direction sensors according to the second embodiment;

FIG. 8 is a view showing the mounted states of X-direction sensors and Y-direction sensors according to the third embodiment; and FIG. 9 is a view for explaining the relationship between an optical axis and an opening axis.

DESCRIPTION OF EMBODIMENTS

The preferred embodiments of the present invention will be described below with reference to the accompanying drawings.

First Embodiment

FIG. 1 is a perspective view showing the basic arrangement of an observation position management microscope system (to be referred to as a microscope system 100 hereinafter) according to this embodiment. The microscope system 100 includes a microscope body 101, a stage apparatus 200, an adapter unit 300 for camera attachment, a digital camera 400, and a control unit 500. The control unit 500 includes controller 501 and a display 502.

A microscope base stand 121 as a component of the microscope body 101 is a robust body frame for the attachment of various types of structures of the microscope. An eyepiece microscope base stand 122 is fixed to the microscope base stand 121. An eyepiece lens barrel 1123 (binoculars in this case) is connected to the eyepiece microscope base stand 122. A light source box 124 accommodates a light source for transmission observation (for example, a halogen lamp or LED) and is attached to the microscope base stand 121. A Z knob 125 is a knob for moving a Z base 130 in the Z-axis direction (up/down direction). The stage apparatus 200 which provides an observation position management function is mounted on the Z base 130. The Z base 130 is attached to the microscope base stand 121 with a Z base moving mechanism 131 which moves the Z base 130 in the Z direction in accordance with the rotation of the Z knob 125. There is a plurality of types of objective lens units 126 in accordance with optical magnifications. A revolver 127 has a structure which allows the attachment of the plurality of types of objective lens units 126. Rotating the revolver 127 can select a desired objective lens unit for observation with the microscope.

The stage apparatus 200 is a component of an XY stage on which a preparation 5 is placed and which moves on an X-Y plane including the X direction and the Y direction. The stage apparatus 200 (XY stage) has, on its upper surface, an XY scale plate 210 having a high-precision scale in the X and Y directions. A sensor for reading the scale on the XY scale plate 210 is arranged on the fixed base of the stage apparatus 200. This sensor will be described in detail later. The stage apparatus 200 is connected to the controller 501 via, for example, a USB interface cable 112. In accordance with a moving instruction from the controller 501, the stage apparatus 200 moves its stage position in the X and Y directions and notifies the controller 501 of the stage position. In addition, an X knob 201 and a Y knob 202 allow a stage position to be moved by manual operations. The adapter unit 300 is an adapter for camera attachment which functions as an attachment unit for attaching the digital camera 400 to the eyepiece microscope base stand 122 through a microscope base stand mount 128.

The digital camera 400 is detachably attached to the microscope body 101 with the adapter unit 300 and the microscope base stand mount 128 so as to hold a predetermined positional relationship with the eyepiece microscope base stand 122. The digital camera 400 captures a microscopic image obtained by the microscope body 101. The digital camera 400 aims at recoding evidence. The digital camera 400 is connected to the controller 501 via, for example, a USB interface cable 111, and captures an observation image under the microscope in response to an instruction from the controller 501. The captured observation image is displayed on the display 502 under the control of the controller 501. The imaging function of the digital camera 400 includes a live image capturing function for performing so-called live viewing to display an output from an image sensor on a monitor in real time and a still image capturing function. The live image capturing function is lower in resolution than the still image capturing function. In addition, the live image capturing function and the still image capturing function can transmit captured images (moving and still images) to an external apparatus via a predetermined interface (a USB interface in this embodiment).

The arrangement of the stage apparatus 200 will be described in detail below. FIG. 2 is a schematic view of the stage apparatus 200 seen from the objective lens side. As described above, the XY scale plate 210 is provided on the upper surface of the stage apparatus 200. An X-direction scale 8 and a Y-direction scale 7 are accurately formed on the upper surface of the XY scale plate 210. The X-direction scale 8 has X-direction axis information used for observation position management at the time of movement in the X direction. The Y-direction scale 7 has Y-direction axis information used for observation position management at the time of movement in the Y direction. Note that the XY scale plate 210 is integrally formed from a material having a very small thermal expansion coefficient, such as synthetic quartz, to obtain a reference for the implementation of high-precision observation position management.

In addition, patterns are produced on the X-direction scale 8 and the Y-direction scale 7 on the XY scale plate 210 by using a nanotechnology using a semiconductor exposure apparatus. For example, the X-direction scale 8 formed from a set of lines in the Y-axis direction and the Y-direction scale 7 formed from a set of lines in the X-axis direction are integrally produced on the quartz wafer with an accuracy of 5 nm to 10 nm by a nanotechnology. Note that the X-direction scale 8 and the Y-direction scale 7 can also be produced by drawing with an exposure apparatus. However, in order to implement low cost production, nano-imprinting is preferably used. Thereafter, the resultant structure is cut into a predetermined shape by a machining process to obtain the XY scale plate 210.

In addition, an X-axis 211 and a Y-axis 212 respectively extend in the X direction and the Y direction, with an observation visual field center as the position of an optical axis 12 of the microscope body 101 being an intersection point. The optical axis 12 as the observation visual field center is arranged to coincide with an opening axis 40 as the center of an optical axis opening portion 4. An X-direction sensor 9a and an X-direction sensor 9b which read the X-direction scale 8 are arranged on the X-axis 211. A Y-direction sensor 6a which reads the Y-direction scale is arranged on the Y-axis 212. The X-direction sensor 9a, the X-direction sensor 9b, the Y-direction sensor 6a, and a Y-direction sensor 6b are arranged on a fixed base 3 (to be described later with reference to FIG. 4), and read the X-direction scale 8 and the Y-direction scale 7 on the XY scale plate 210 arranged on the upper surface of the stage apparatus 200.

Note that the two X-direction sensors 9a and 9b are arranged on the X-axis 211, as shown in FIGS. 5 and 7, and their interval is shorter than the length of the X-direction scale 8 in the X direction. For this reason, the two X-direction sensors can have a timing that allows them to read the X-direction scale 8 at the same time and be configured to be switched at the timing to be used for a reading operation. In addition, the Y-direction sensor 6a reads a position in the Y direction from the Y-direction scale 7, and the Y-direction sensor 6b detects the skew of the stage from the Y-direction scale.

FIG. 3 is a perspective view showing the outer appearance of the stage apparatus 200 according to the first embodiment. The stage apparatus 200 includes a Y stage 1, an X stage 2, and the fixed base 3. The fixed base 3 is fixed to the Z base 130 of the microscope body 101. The X stage 2 as a movable stage can move on the fixed base 3 in the X direction. The Y stage 1 as another movable stage can move on the X stage 2 in the Y direction. As a consequence, the Y stage 1 can move in the X and Y directions relative to the fixed base 3 while the preparation 5 on which a tissue or the like as an observation target is placed is placed on the stage, thereby moving an arbitrary position on the observation target into the observation visual field. In addition, the XY scale plate 210 is fixed to the Y stage 1. The optical axis opening portion 4 is an opening portion provided in the fixed base 3 to pass light for transmission observation with the microscope. In this embodiment, the center (opening axis 40) of the optical axis opening portion 4 coincides with the optical axis 12 of the microscope body 101. The XY scale plate 210 including the X-direction scale 8 and the Y-direction scale 7 is mounted on the upper surface of the Y stage 1, and can be read by the X-direction sensors 9a and 9b and the Y-direction sensors 6a and 6b mounted on the fixed base 3.

FIG. 4 is a perspective view showing the fixed base 3 of the stage apparatus 200. As described above, the fixed base 3 has the optical axis opening portion 4 which is, for example, a circular opening for preventing interference with an illumination system such as a condenser lens, and is provided on the Z base 130 such that the opening axis 40 as the center of the opening portion becomes coaxial with the optical axis 12. The X-direction sensors 9a and 9b and the Y-direction sensors 6a and 6b for reading the X-direction scale 8 and the Y-direction scale 7 are arranged on the fixed base 3. If, for example, the fixed base 3 is made of aluminum, since it has a relatively large thermal expansion coefficient, thermal expansion is caused by, for example, variations in room temperature. Assume that the fixed base 3 has thermally expanded in this manner. In this case, if the positions of the X-direction sensors 9a and 9b and the Y-direction sensors 6a and 6b vary relative to the observation visual field center (the optical axis 12 of the microscope), errors occur in the read positions of the respective sensors at the time of reading operations. FIG. 9 is a side view of the microscope body 101. The microscope base stand 121 and the fixed base 3 are made of, for example, aluminum members. When the microscope base stand 121 and the fixed base 3 have thermally expanded due to, for example, variations in room temperature, a distance ΔL1 between the optical axis 12 of the objective lens and a side surface of the microscope base stand and a distance ΔL2 between the opening axis 40 and the side surface of the microscope base stand increase by almost the same dimension, thus maintaining the coaxial relationship. It is therefore necessary to eliminate or reduce the influence of temperature on the arrangement (directions and distances) of the X-direction sensors and the Y-direction sensors relative to the opening axis 40. For this reason, according to this embodiment, the X-direction sensors 9a and 9b and the Y-direction sensors 6a and 6b are respectively arranged on an X-direction sensor base 15 and a Y-direction sensor base 16, each formed from a material having a small thermal expansion coefficient, to eliminate or reduce the influence of thermal expansion of the fixed base 3.

FIG. 5 is a view for explaining the mounting of the X-direction sensors and the Y-direction sensors on the fixed base 3 according to the first embodiment. As described above, the observation visual field center is at the position of the optical axis 12 of the microscope. According to this embodiment, the stage apparatus 200 is fixed to the microscope body 101 such that the observation visual field center coincides with the center (opening axis 40) of the optical axis opening portion 4. A sensor substrate 14 is provided with a circuit for processing signals from the Y-direction sensors 6a and 6b and the X-direction sensors 9a and 9b.

The X-direction sensors 9a and 9b are mounted on the X-direction sensor base 15. The X-direction sensor base 15 is fixed to the fixed base 3 with X-direction first fixing portions 17 and an X-direction second fixing unit 19. Likewise, the Y-direction sensors 6a and 6b are mounted on a Y-direction sensor base 16. The Y-direction sensor base 16 is fixed to the fixed base 3 with Y-direction first fixing portions 18 and a Y-direction second fixing unit 20. A material having a smaller thermal expansion coefficient than the fixed base 3 is used for the X-direction sensor base 15 and the Y-direction sensor base 16. For example, the fixed base 3 is formed from aluminum like the microscope body, and the X-direction sensor base 15 and the Y-direction sensor base 16 are formed from an invar material. In addition, the X-direction sensor base 15 and the Y-direction sensor base 16 are arranged along the circumference of the optical axis opening portion 4, and each have a semi-arc shape centered on the opening axis 40.

The X-direction first fixing portions 17 and the Y-direction first fixing portions 18 respectively fix the X-direction sensor base 15 and the Y-direction sensor base 16 to the fixed base 3 with, for example, screws. In addition, the X-direction second fixing unit 19 is constituted by a slotted hole 21 longer in the X direction and a threaded portion 22, as shown in FIG. 5. The X-direction second fixing unit 19 holds the X-direction sensor base 15 so as to allow it to move in the X direction, thereby preventing the X-direction sensor base 15 from following the expansion of the fixed base 3 in the X direction. This arrangement reduces the shifts of the X-direction sensors 9a and 9b in the X direction which are caused by the thermal expansion of the fixed base 3, and reduces read errors concerning the X-direction scale 8. The Y-direction second fixing unit 20 is constituted by a slotted hole 23 longer in the Y direction and a threaded portion 24, as shown in FIG. 5. The Y-direction second fixing unit 20 holds the Y-direction sensor base 16 so as to allow it to move in the Y direction, thereby preventing the Y-direction sensor base 16 from following the expansion of the fixed base 3 in the Y direction. This arrangement reduces the shifts of the Y-direction sensors 6a and 6b in the Y direction which are caused by the thermal expansion of the fixed base 3, and reduces read errors concerning the Y-direction scale 7.

The positional relationship between the respective fixing portions (fixing positions) will be described below. The X-axis 211 is an axis passing through the opening axis 40 of the fixed base 3 and having the moving direction (the X direction) of the X stage 2. The Y-axis 212 is an axis passing through the opening axis 40 of the fixed base 3 and having the moving direction (the Y direction perpendicular to the X direction) of the Y stage 1. The two X-direction first fixing portions 17 are provided on or near the Y-axis 212 at positions symmetrical with respect to the X-axis 211. The two Y-direction first fixing portions 18 are provided on or near the Y-axis 212 at positions symmetrical with respect to the Y-axis 212. The X-direction second fixing unit 19 is provided near the X-axis 211 and the arrangement positions of the X-direction sensors 9a and 9b and fixed to the fixed base 3 so as to be expandable (movable) in the X direction relative to the thermal expansion of the fixed base 3. Likewise, the Y-direction second fixing unit 20 is provided near the Y-axis 212 and the arrangement positions of the Y-direction sensors 6a and 6b and fixed to the fixed base 3 so as to be expandable (movable) in the Y direction relative to the thermal expansion of the fixed base 3. The outer shape of the X-direction sensor base 15 mounted on the fixed base 3 is almost symmetrical with respect to the X-axis 211. Likewise, the outer shape of the Y-direction sensor base 16 mounted on the fixed base 3 is almost symmetrical with respect to the X-axis 212. Arranging fixing positions in this manner will more effectively reduce variations in the positions of the respective sensors caused by the thermal expansion of the fixed base 3. Note that it is possible to define the positions of the fixing portions by using the X-direction axis and the Y-direction axis passing through a specific position on the fixed base 3 instead of using the X-axis 211 and the Y-axis 212 passing through the opening axis 40. Note however that in order to maintain the positional relationship between the optical axis 12 and the X-direction sensors 9a and 9b and the positional relationship between the optical axis 12 and the Y-direction sensors 6a and 6b, it is preferable to set the position of the opening axis 40 coinciding with the optical axis 12 or a nearby position as a specific position.

As described above, the Y-direction sensor base 16 on which the Y-direction sensors 6a and 6b are mounted is fixed to the fixed base 3 with the two Y-direction first fixing portions 18 using screws and fixed so as to be movable in the Y direction with the slotted hole 23 of the Y-direction second fixing unit 20. With this arrangement, when the fixed base 3 thermally expands in the Y direction (the up/down direction in FIG. 5) centered on the observation visual field center (the optical axis 12), the slotted hole 23 of the Y-direction second fixing unit 20 absorbs the expansion difference between the fixed base 3 and the Y-direction sensor base 16. Likewise, the X-direction sensor base 15 on which the X-direction sensors 9a and 9b are mounted is fixed to the fixed base 3 with the two X-direction first fixing portions 17 using screws and fixed so as to be movable in the X direction with the slotted hole 21 of the X-direction second fixing unit 19. With this arrangement, when the fixed base 3 thermally expands in the X direction (the left/right direction in FIG. 5) centered on the observation visual field center (the optical axis 12), the slotted hole 21 of the X-direction second fixing unit 19 absorbs the expansion difference between the fixed base 3 and the X-direction sensor base 15.

Referring to FIG. 3, the XY scale plate 2:10 having the Y-direction scale 7 and the X-direction scale 8 is arranged on the Y stage 1. The XY scale plate 210 is formed from silica glass having a small thermal expansion coefficient and is fixed to the Y stage 1 with an invar material or the like (not shown). This structure is resistant to the influence of heat. In addition, with the above arrangement, even if the fixed base 3 deforms due to thermal expansion, the positions of the X-direction sensors 9a and 9b in the X direction and the positions of the Y-direction sensors 6a and 6b in the Y direction relative to the opening axis 40 (observation visual field center) of the fixed base 3 are maintained, thereby obtaining an accurate stage position. As described above, the Y-direction sensors 6a and 6b and the X-direction sensors 9a and 9b are both structured to be resistant to the influence of the thermal expansion of the fixed base 3. The resultant structure is robust against positional shifts caused by the thermal expansion of the scales and the sensors. This makes it possible to accurately control the positions of the Y stage 1 and the X stage 2 without the influence of temperature changes.

Second Embodiment

In the first embodiment, the X-direction sensor base 15 and the Y-direction sensor base 16 each have an almost arc shape. However, this is not exhaustive. The second embodiment will exemplify an X-direction sensor base 15 and a Y-direction sensor base 16 each having an almost U shape as another shape. Note that a stage apparatus has the same outer appearance as that in the first embodiment (FIG. 2).

FIG. 6 is a perspective view showing the outer appearance of a fixed base 3 of a stage apparatus 200 according to the second embodiment. The same reference numerals as in the first embodiment (FIG. 4) denote the same constituent elements. An X-direction sensor base 15a and a Y-direction sensor base 16a, each having an almost U shape, are ganged around an optical axis opening portion 4.

FIG. 7 is a view for explaining the mounting of an X-direction sensor and a Y-direction sensor on the fixed base 3 according to the second embodiment. The same reference numerals as in the first embodiment (FIG. 5) denote the same constituent elements. As in the first embodiment, the X-direction sensor base 15a is fixed to the fixed base 3 with two X-direction first fixing portions 17 and one X-direction second fixing unit 19, and the Y-direction sensor base 16a is fixed to the fixed base 3 with two Y-direction first fixing portions 18 and one Y-direction second fixing unit 20. A material (for example, an invar material) having a smaller thermal expansion coefficient than the fixed base 3 is used for the X-direction sensor base 15a and the Y-direction sensor base 16a.

The positional relationship between the X-direction first fixing portions 17, the X-direction second fixing unit 19, the Y-direction first fixing portions 18, and the Y-direction second fixing unit 20 are the same as those in the first embodiment. Therefore, on the same principle as that in the first embodiment, in the second embodiment as well, the thermal expansion differences between the fixed base 3, the X-direction sensor base 15a, and the Y-direction sensor base 16a are absorbed. This will maintain the positions of X-direction sensors 9a and 9b in the X direction and the positions of Y-direction sensors 6a and 6b in the Y direction relative to an opening axis 40 (observation visual field center) of be fixed base 3, thereby obtaining an accurate stage position.

Note that the X-direction sensor base 15a and the Y-direction sensor base 16a each partly have an almost arc shape. Such an arrangement is adopted to locate the X-direction first fixing portions 17 of the X-direction sensor base 15a and the Y-direction first fixing portions 18 of the Y-direction sensor base 16a as near to the optical axis opening portion 4 (the observation visual field center) as possible. In addition, the X-direction sensor base 15a mounted on the fixed base 3 is almost symmetrical with respect to an X-axis 211. Likewise, the Y-direction sensor base 16a mounted on the fixed base 3 is almost symmetrical with respect to a Y-axis 212.

Note that in each of the first and second embodiments, when the fixed base 3 expands in the Y direction perpendicular to the X direction which coincides with the read axis of the X-direction sensors 9a and 9b, the interval between the X-direction first fixing portions 17 on the X-direction sensor base 15 or 15a increases. For this reason, the positions of the X-direction sensors 9a and 9b are pulled in the X direction toward the opening axis 40 (that is, the observation visual field center (optical axis 12)). Likewise, when the fixed base 3 expands in the X direction, the positions of the Y-direction sensors 6a and 6b on the Y-direction sensor base 16 or 16a are pulled in the Y direction toward the observation visual field center. That is, as the fixed base expands in a direction perpendicular to the read direction, the position of each sensor is pulled in a direction toward the observation visual field center. If this phenomenon becomes noticeable, it may cause a read error. Using the sensor bases having the almost U shapes described in the second embodiment will further reduce the influence of expansion in a direction perpendicular to the read direction as compared with the sensor bases having the almost arc shapes described in the first embodiment.

Note that in order to cope with expansion in a direction perpendicular to the read direction as in the above case, at least one of the two first fixing portions may be fixed so as to be movable in the direction perpendicular to the read direction. For example, at least one of the X-direction first fixing portions 17 of the X-direction sensor base 15 (15a) is fixed so as to be movable in the Y direction with a slotted hole extending in the Y direction. This will maintain the interval between the two X-direction first fixing portions 17 with respect to the expansion of the fixed base 3 in the Y direction and reduce the degrees of pulling of the X-direction sensors 9a and 9b in the X direction. This applies to the Y-direction sensor base 16 (16a).

Third Embodiment

FIG. 8 is a view for explaining the mounting of X-direction sensors and Y-direction sensors on a fixed base 3 according to the third embodiment. An X-direction sensor base 15b and a Y-direction sensor base 16b are used in place of the X-direction sensor base 15a and the Y-direction sensor base 16a each having the U shape according to the second embodiment. The X-direction sensor base 15b is obtained by connecting three almost rectangular members with hinges 171 on their end portions into a U shape. The Y-direction sensor base 16b is obtained by connecting three almost rectangular members with hinges 181 on their end portions into a U shape. Both the X-direction sensor base 15b and the Y-direction sensor base 16b are configured such that each almost U-shaped member forming the U shape can rotate about the hinge on the proximal end of each member. With this arrangement, even if the fixed base 3 expands in the Y direction perpendicular to the X direction coinciding with the read axis of X-direction sensors 9a and 9b and the interval between X-direction first fixing portions 17 increases, the positions of the X-direction sensors 9a and 9b on the X-direction sensor base 15b are not pulled in the X direction toward the observation visual field center. Likewise, the expansion of the fixed base 3 in the X direction does not cause the positions of Y-direction sensors 6a and 6b on the Y-direction sensor base 16b to be pulled in the Y direction toward the observation visual field center. That is, the position of each sensor is not pulled in a direction toward the observation visual field center by the expansion of the fixed base in a direction perpendicular to the read direction. Using the almost U-shaped sensor bases having the hinges described in the third embodiment will further reduce the influence of expansion in a direction perpendicular to the read direction as described above as compared with the U-shaped sensor bases described in the second embodiment. Note that as the magnitudes of rotation vary depending on the friction states and the like of the hinges 171 and 181, a force may be added to the X-direction sensor base 15b to move the X-direction sensors 9a and 9b in the Y direction, and a force may be added to the Y-direction sensor base 16b to move the Y-direction sensors 6a and 6b in the X direction. In order to reduce such movement, it is preferable to further improve accuracy on the short-axis side of a slotted, hole of each of an X-direction second fixing unit 19 and a Y-direction second fixing unit 20. In addition, X-direction second fixing units 19 and Y-direction second fixing units 20 may be provided at a plurality of portions.

The stage apparatus 200 described in each of the above embodiments is mounted on a microscope body 101 such that the center of an optical axis opening portion 4 coincides with the optical axis of an opening axis 40. This arrangement can reduce the influence of the expansion of the fixed base 3 caused by a temperature change on observation position management for the stage apparatus 200. This can implement high-precision management of the observation position of the microscope.

Note that in each embodiment described above, the X-direction sensor base 15 (15a) may be integrally formed, including the portions which fix the X-direction sensors 9a and 9b, or may be formed by fixing a discrete plate to a member having an almost arc shape (almost U shape). In this case, the discrete plate is preferably formed from the same material as that for the member having the almost arc shape.

In addition, in the above embodiments, although an invar material is used for the X-direction sensor bases 15 and 15a and the Y-direction sensor bases 16 and 16a, this is not exhaustive. For example, synthetic quartz may be used. Furthermore, each embodiment described above uses the slotted holes for the X-direction second fixing unit 19 and the Y-direction second fixing unit 20. However, this is not exhaustive. For example, at the X-direction second fixing unit 19 and the Y-direction second fixing unit 20, the fixed base 3 and the respective sensor bases may be fixed through elastic members. In addition, movement accuracy in the axis direction may be further improved by arranging two slotted holes of the second fixing portion side by side in the same direction.

In addition, each embodiment described above has exemplified the arrangement having the two X-direction sensors and the two Y-direction sensors. However, this is not exhaustive. The numbers of X-direction sensors and Y-direction sensors each may be one or three or more.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-079616, filed Apr. 8, 2015, which is hereby incorporated by reference herein in its entirety.

The invention claimed is:

1. A stage apparatus including a fixed base and a first stage movable in a first direction relative to the fixed base, the apparatus comprising:
    a sensor configured to read a scale moving in the first direction together with the first stage; and
    a sensor base formed from a material having a smaller thermal expansion coefficient than the fixed base and configured to fix the sensor to the fixed base,
    wherein the sensor base is fixed to the fixed base at two first fixing positions located near a second axis having a second direction perpendicular to the first direction and passing through a specific position on the fixed base and sandwiching a first axis having the first direction and passing through the specific position, and is fixed to the fixed base at a second fixing position near the first axis and an arrangement position of the sensor so as to be movable in the first direction.

2. The apparatus according to claim 1, wherein the sensor base fixed to the fixed base at the first fixing position and the second fixing position has a substantially symmetrical shape with respect to the first axis.

3. The apparatus according to claim 1, wherein the specific position is a center of an opening which is provided in the fixed base and passes light for transmission observation with a microscope.

4. The apparatus according to claim 3, wherein the sensor base has a substantially arc shape and is arranged around the opening.

5. The apparatus according to claim 3, wherein the sensor base has a substantially U shape and is arranged around the opening.

6. The apparatus according to claim 5, wherein the sensor base comprises three substantially rectangular members rotatably connected at end portions and formed into a substantially U shape.

7. The apparatus according claim 1, wherein the second fixing position has a slotted hole extending in the first direction.

8. The apparatus according claim 1, wherein at the second fixing position, the fixed base and the sensor base are fixed to each other through an elastic member.

9. The apparatus according claim 1, wherein the sensor base is formed from an invar material.

10. The apparatus according claim 1, wherein the sensor base is formed from synthetic quartz.

11. The apparatus according to claim 1, further comprising:
    a second stage configured to move in the second direction relative to the first stage;
    a second sensor configured to read a scale moving in the second direction together with the second stage; and
    a second sensor base formed from a material having a smaller thermal expansion coefficient than the second stage and configured to fix the second sensor to the fixed base,
    wherein the second sensor base is fixed to the fixed base at two third fixing positions located near the first axis and is sandwiching the specific position, and is fixed to the fixed base at a fourth fixing position located near the second axis and an arrangement position of the second sensor so as to be movable in the second direction.

12. A microscope comprising a stage apparatus including a fixed base and a first stage movable in a first direction relative to the fixed base, the stage apparatus comprising:
    a sensor configured to read a scale moving in the first direction together with the first stage; and
    a sensor base formed from a material having a smaller thermal expansion coefficient than the fixed base and configured to fix the sensor to the fixed base,
    wherein the sensor base is fixed to the fixed base at two first fixing positions located near a second axis having a second direction perpendicular to the first direction and passing through a specific position on the fixed base and sandwiching a first axis having the first direction and passing through the specific position, and is fixed to the fixed base at a second fixing position near the first axis and an arrangement position of the sensor so as to be movable in the first direction, and
    wherein the stage apparatus moves a preparation placed thereon to an observation visual field.

* * * * *